May 23, 1967 P. A. DION 3,320,666
CLADDING OF CORE MATERIALS
Filed Feb. 26, 1964
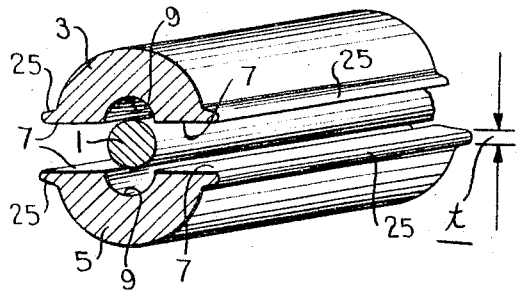
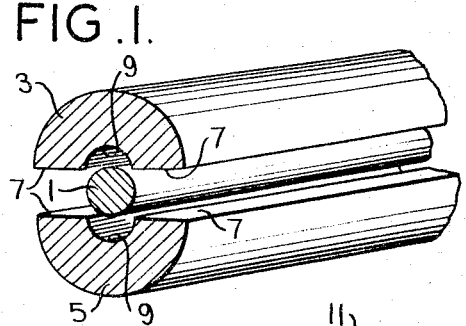
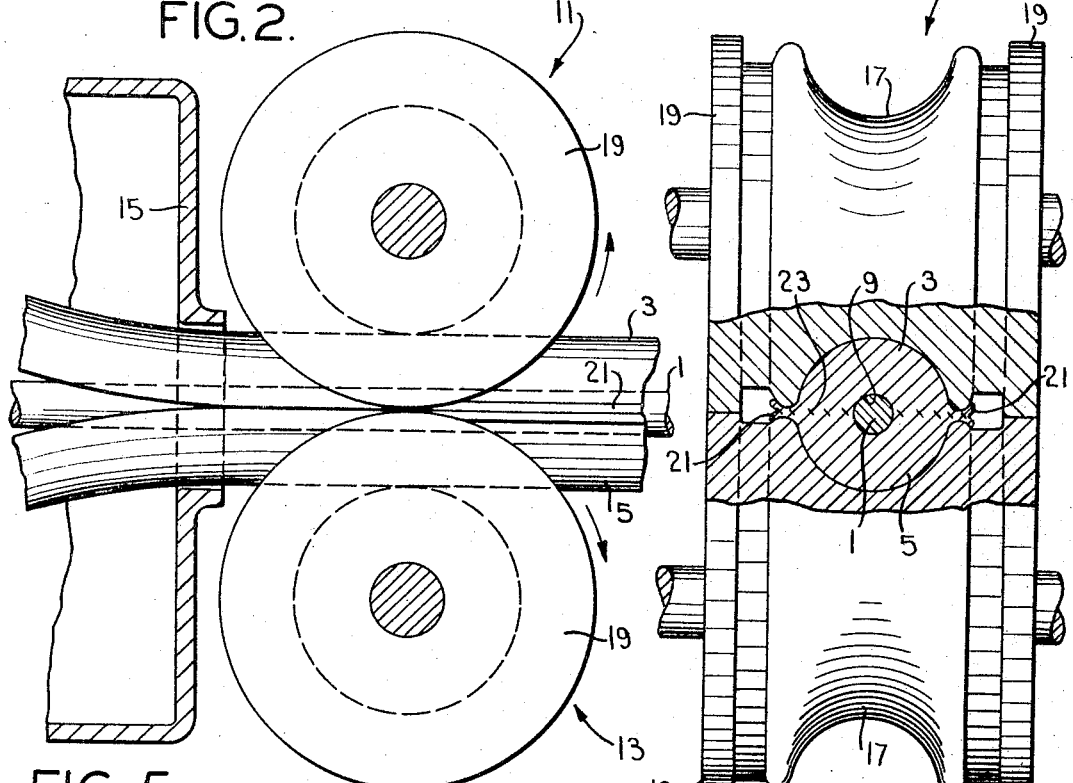
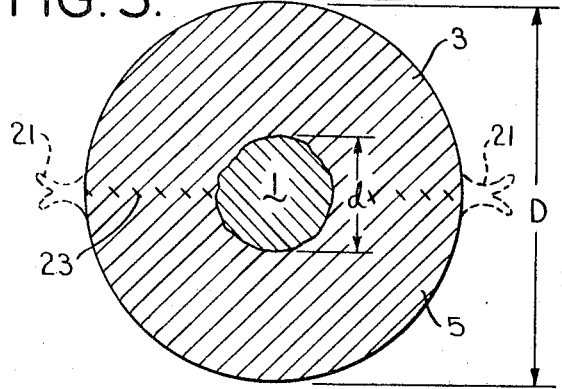
Paul A. Dion,
Inventor.
Koenig, Senniger,
Powers and Leavitt,
Attorneys.

United States Patent Office 3,320,666
Patented May 23, 1967

3,320,666
CLADDING OF CORE MATERIALS
Paul A. Dion, North Attleboro, Mass., assignor to Texas
Instruments Incorporated, Dallas, Tex., a corporation
of Delaware
Filed Feb. 26, 1964, Ser. No. 347,606
6 Claims. (Cl. 29—473.3)

This invention relates to the cladding of core materials such as wires, rods, tubing and the like, and with regard to certain more specific features, to continuous cladding of such materials by solid-phase bonding.

Among the several objects of the invention may be noted the provision of a continuous process for accurately cladding of core materials such as wires, rods, tubing and the like by solid-phase bonding, according to which there may be obtained a higher ratio than heretofore between the cross-sectional area of the cladding and the complete cross-sectional area of the finished product; the provision of a process of the class described which considerably reduces the proportion of edge scrap loss which has heretofore occurred; the provision of a clad product in the form of wire, rod, tubing or the like which is solid-phase bonded and which has said higher ratio; and the provision of a process of the class described which may be carried out by conventional metal-forming equipment. Other objects and features will be in part apparent and in part pointed out hereinafter.

The invention accordingly comprises the steps and sequence of steps, and features of manipulation which will be exemplified in the products and methods hereinafter described, and the scope of the application of which will be indicated in the following claims.

In the accompanying drawings, in which several of various possible embodiments of the invention are illustrated, FIG. 1 is a trimetric view illustrating cladding material preformed according to one step of the process;

FIG. 2 is a side elevation illustrating a solid-phase squeezing and bonding step;

FIG. 3 is a right-end view of FIG. 2, parts being broken away;

FIG. 4 is a view similar to FIG. 1, illustrating an alternative preforming step; and FIG. 5 is a characteristic enlarged cross section of the product obtained by the process, the dotted lines illustrating certain removed edge scrap.

Corresponding reference characters indicate corresponding parts throughout the several views of the drawings.

Solid-phase bonding processes for cladding core materials such as wire, rod, tubing or the like have been limited to relatively thin cladding, such for example as that which occupies on the order of not more than 30%–40% or so of the total cross-sectional area of the bonded product. The particular percentage has depended upon the combinations of materials used and sometimes was even less than the above-indicated range. Moreover, as attempts have been made to increase cladding thickness, so has the scrap loss increased. A reason for this is that the prior cladding processes in general employed strips of ribbon-like form for the starting material of the cladding portions. These were required to be bent into place around the core as rolling occurred in the performance of the squeezing step required for solid-phase bonding. This entailed marginal scrap loss which, although of an acceptable amount when the cladding was thin, became unacceptable when thick flat strips were employed. Moreover, the character of the bond produced in the thicker cladding was not as satisfactory as that which is produced by means of the present invention.

Referring now more particularly to the drawings, numeral 1 indicates typical metallic core material shown in the form of a circular wire, but which it will be understood may be in the form of a rod or a tube and may in some instances deviate from a circular form. Referring to FIG. 1, numerals 3 and 5 indicate two halves of one form of metallic cladding strip material. Any of various metals may be employed for parts 1, 3 and 5, since practically all metals are amenable to solid-phase bonding processes such as shown, for example, in United States Patents 2,691,815 and 2,753,623, the disclosures of which are incorporated herein by reference. For example wire 1 may be composed of copper and the cladding strip members 3 and 5 may be composed of 1006 low-carbon steel.

The two halves of the material 3 and 5, instead of being of comparatively thin ribbon-like form as heretofore which during the rolling process employed were bent over the core 1, are, according to the invention, preformed before arriving at conjunction for rolling with the core 1. The preforming of strips 3 and 5 is done by conventional rolling, extrusion, drawing or the like. The preforming is such that the strips 3 and 5 are trough-shaped with their marginal portions 7 substantially parallel for conjugate engagement therebetween when the concave portion 9 of each is caused interfacially to fit around the outside shape of the core 1 by slight pressure. The result is a trough shape for each of members 3 and 5, the radial thickness of each being substantially more than heretofore when bonding ribbon-like strips to cores.

The terms wire, rod or tubing are to be understood to encompass circular or other cross-sectional shapes for the core, and the term trough-shaped strips is to be understood to encompass any preformed strips for cladding which have their inner concave surfaces formed like the surface of the core and their marginal surfaces substantially conjugate to one another. In the examples shown, the concavities 9 are circular and may have radii equal to or slightly larger or smaller than the radius of the core 1 so that no substantial cross bending of members 3 and 5 is required to cause the groves 9 snugly to fit around core 1. Thus it will be appreciated that although a circular form of core 1 and circular forms of the trough-shaped strips 3 and 5 are shown, other cross-sectional shapes of these may be employed, providing the shapes of the members 3 and 5 are capable of functioning as completely enclosing conjugate jacket-forming trough members around the core 1 without the necessity for initially applying high transverse bending forces to force the strip member around the core.

In preparation for solid-phase bonding, the core 1 and the members 3 and 5 may be suitably cleaned as set forth in said patents. Next they are fed to a pair of squeezing rolls 11 and 13 (FIGS. 2 and 3). They may, if desired, be caused to pass through a heating furnace such as indicated at 15 for preliminary heating as set forth in said Patent 2,753,623. As noted in the last-mentioned patent, the heating step does not bring temperatures up sufficiently to cause any melting or any liquid phase. Moreover, this heating step may be omitted.

It will be understood that other suitable methods of heating may be used such as electrical resistance heating or electrical induction heating. Further, the heating step is carried out in a suitable atmosphere.

The rolls squeeze together the strips 3 and 5 under heavy pressure of such an amount as to effect substantial reduction in the outside radii of strips 3 and 5, with concomitant solid-phase bonding both between the contacting surfaces 7 and the surface of core 1 to the inner surfaces of the strip grooves 9. Flanges 19 on the rolls limit their approach, although these are not necessary in all cases. Some reduction in diameter of the core 1 may also occur. Since the reduction effect results in elongate flow of material at the squeezed interfaces between members 1, 3 and 5, solid-phase bonding occurs. However, cross bending is nil. Some material is squeezed out from beneath the sides of grooves of the rolls 17, as indicated at 21, which is known as edge scrap and is of a comparatively small amount when the process of the invention is employed.

It can be seen that if comparatively flat ribbon-like strips of the thicknesses of the preformed channel-shaped strips 3 and 5 were used as starting materials, the cross bending of them on core 1 that would be required upon entry between the rolls 11 and 13 would entail undesirable deformations. Also, a large amount of edgewise material would need to be disposed of by outflow from the sides of the grooves 17, thus entailing a large amount of edge scrap. The small amount of edge scrap 21 obtained by use of the invention can readily be removed or obliterated by suitable skiving, drawing or other appropriate operation. Portions to be removed are suggested by the dotted lines in FIG. 5. After leaving the rolls 11, 13, the assembly 1, 3, 5 may be heated to bring about sintering to improve the bond in the manner set forth in said patents.

With starting materials such as shown in FIG. 1 there may be some tendency unless precautions are taken in feeding parts 1, 3 and 5 to the rolls, to twist as the rolls 11 and 13 are approached. This tends to cause the bonded region 23 to twist somewhat out of a flat plane. While this is an acceptable condition for some production, for the best product it is to be avoided. In any event, it is preferred to avoid the necessity for inlet guide means or control. By using starting materials such as shown in FIG. 4, self-guiding and a preferable product is obtained. In FIG. 4 like numerals designate like parts. The improved feature is in the provision at the outside margin of each preformed channel-shaped strip 3 and 5 of a bead or rib 25. In this case, pairs of such ribs come into close relationship at the side nips of the roll grooves 17 as the materials enter the rolls 11 and 13 for squeezing. This prevents twisting and maintains the bonding region in a substantially flat plane.

After bonding has been completed and the edge scrap removed, the cross section of the finished material may be reduced as desired, as for example by drawing from the as-bonded size to a finally desired size; for example, from .186 inch diameter, as bonded, to .092 inch final diameter.

As an example of what can be accomplished by means of the invention, the ratio in the finished product of the cross section of the area occupied by the members 3 and 5 to the entire cross section of the finished product may be on the order of 90% or more. Cross sectional ratios less than 90% may also be achieved. This large ratio of 90% heretofore has not been possible by employing former methods of wire or like cladding by the solid-phase bonding process. Such a ratio corresponds to a ratio of diameters $D:d$ on solid wire or tubing on the order of 3:1 (see FIG. 5). A suitable thickness $t$ for each rib 25 may be on the order of .015 inch. Each pair of these ribs is pinched down to about .008 inch thickness in the finished product before removal.

While the invention has been described as showing two semicircular strips clad to the core, employing two squeezing rolls, it will be understood that the process could also be carried out by the use of a greater number of partially circular strips on the core and the employment of an equal number of squeezing rolls, one each of which is operative on each cladding strip.

In view of the above, it will be seen that the several objects of the invention are achieved and other advantageous results attained.

As many changes could be made in the above products and methods without departing from the scope of the invention, it is intended that all matter contained in the above description or shown in the accompanying drawings shall be interpreted as illustrative and not in a limiting sense.

What is claimed is:

1. The process of cladding elongate circular metal core material having a comparatively small cross-sectional area, comprising preforming elongate metal strips of a comparatively large total cross-sectional area, each with a central groove conjugately to accept the circular metal core material between them and provided with marginal radially directed portions formed to be located conjugately to one another, directing the strips together and around the core material, and then in one compression step between rolls sufficiently squeezing the core material and the strips when so located for solid-phase bonding of the strips to the core material and to one another across said radially directed portions.

2. The process according to claim 1, wherein the performation of said strips includes the formation of opposite marginal ribs on each to form guide means for the strips upon entering the nip space between the rolls to maintain a plane configuration of the resulting solid-phase bond areas between said radially directed portions.

3. The process of cladding elongate circular core material of comparatively small cross section, comprising preforming strips of externally circular metal of comparatively large total cross section with substantially circular central grooves which are substantially conjugate in form to said core material and with marginal portions forming outwardly extending ribs which are substantially conjugate to one another, bringing the strips into conjugate positions around the core material, and with one another at the ribs, and in one step squeezing said core material and strips in said substantially conjugate positions with respect to one another between compression rolls having spaced side portions accepting said ribs for solid-phase bonding of the strips to the core material and to one another, said ribs in said spaced side portions of the rolls forming guide means for the strips to maintain a plane configuration of the bonding areas between said ribs.

4. The process of cladding elongate circular metal core material of comparatively small cross-sectional area, comprising preforming exteriorly circular elongate metal of comparatively large total cross-sectional areas, each with a circular central groove to accept and conjugately fit the circular metal core material between them and provided with radially flat portions terminated by radially extending ribs, the flat portions and ribs on one strip to be located conjugately with the flat portions and ribs respectively on the other strip when the strips are pushed together conjugately around the core material, squeezing the core material and strips in one compression step when so located between rolls having circularly grooved faces with spaced margins for solid-phase bonding of the strips to the core material and to one another with a substantial size reduction and metal flow including some flow between the spaced margins of the rolls.

5. The process of applying to an elongate circular metal core material circular metal cladding, comprising preforming two semicircular cladding strips having wall thicknesses such that the sum of their cross-sectional areas equals approximately 90% or more of the sum of their said cross-sectional areas and the cross-sectional area of the core material, the central portions of said cladding strips being semicircular and their marginal portions being substantially flat so as to become conjugate to the core material and to one another, and feeding said core material and strips in substantially conjugate positions with respect to one another to squeezing rolls for solid-phase bonding of the strips to the core material and to one another in one compression step and by a reduction in the total diameter of the cladding as the rolls effect squeezing.

6. The process according to claim 5, wherein the preformation of the cladding strips includes marginal ribs, and said rolls include sidewise spaces to accept outflow of squeezed material to guide the bonded product for level bonded areas between said marginal portions and between the ribs while forming edge scrap, and removing said edge scrap.

References Cited by the Examiner

UNITED STATES PATENTS

| | | | |
|---|---|---|---|
| 246,407 | 8/1881 | McTighe | 29—470.1 XR |
| 2,691,815 | 11/1954 | Boessenkool et al. | 29—497.5 |
| 2,753,623 | 7/1956 | Boessenkool et al. | 29—497.5 |
| 2,859,061 | 11/1958 | Reid. | |
| 3,054,176 | 9/1962 | Beneke | 29—473.3 XR |
| 3,058,861 | 10/1962 | Rutter. | |
| 3,167,857 | 2/1965 | Tetsue Saito et al. | 29—492 XR |
| 3,220,106 | 11/1965 | Clark | 29—474.1 XR |

JOHN F. CAMPBELL, *Primary Examiner.*

CHARLIE T. MOON, *Examiner.*

L. J. WESTFALL, *Assistant Examiner.*